United States Patent [19]

Würmli

[11] Patent Number: 4,480,740
[45] Date of Patent: Nov. 6, 1984

[54] APPARATUS FOR SORTING CONICAL BOBBIN TUBES

[75] Inventor: Arthur Würmli, Winterthur, Switzerland

[73] Assignee: Rieter Machine Works Limited, Winterthur, Switzerland

[21] Appl. No.: 396,905

[22] PCT Filed: Dec. 2, 1981

[86] PCT No.: PCT/EP81/00187

§ 371 Date: Jul. 6, 1982

§ 102(e) Date: Jul. 6, 1982

[87] PCT Pub. No.: WO82/02186

PCT Pub. Date: Jul. 8, 1982

[30] Foreign Application Priority Data

Dec. 23, 1980 [CH] Switzerland ............ 9496/80

[51] Int. Cl.³ .................................... B65G 47/24
[52] U.S. Cl. ........................... 198/400; 57/272; 242/35.5 A
[58] Field of Search ............ 198/384, 412, 436, 399, 198/398, 397, 395, 456, 400, 388; 57/272, 276, 270, 271; 242/35.5 A

[56] References Cited

U.S. PATENT DOCUMENTS 3,712,451  1/1973  Vignon ........................ 198/397
3,811,550  5/1974  Ajero ......................... 198/382
3,973,672  8/1976  Frost ......................... 198/412
4,099,609  7/1978  Kieronski et al. ............. 198/399 X

OTHER PUBLICATIONS

PCT Published Application; #PCT/EP79/00038; Priority Date: 6/6/78; Int'l. Filing Date: 5/23/79; Inventor: Oswald and Reitschin.

Primary Examiner—Joseph E. Valenza
Assistant Examiner—Dennis Williamson
Attorney, Agent, or Firm—Werner W. Kleeman

[57] ABSTRACT

The present invention concerns an apparatus for sorting conical bobbin tubes, using trough-shaped transporting pockets, into which the bobbin tubes are placed individually, and in which they are shifted at a bias to their longitudinal direction. According to the invention the bobbin tubes pass under two rolls, which with respect to the direction of this movement are arranged inclined at an angle in the same sense, and which are mounted on a frame which is pivotable about an axis. One, and only this one of the rolls, namely the one, under which the bobbin tube zone of greater diameter passes, contacts the bobbin tube, and owing to its inclined arrangement effects a shifting movement of the bobbin tube in its longitudinal direction. In this manner the bobbin tubes are shifted into different positions depending on the position of their bobbin tube foot ends relative to their tip ends, and in this manner are sorted. A main application of the invention is seen in the use for supplying bobbin tubes, with the same ends oriented towards the same side, to the bobbin transporting belt of ring spinning and ring twisting machines. On such machines the bobbin tubes, once sorted, can be arranged, e.g. using a drop chute, with the same ends to the same side in simple manner. A substantial advantage of the invention is seen in that the apparatus adapts automatically to bobbin tubes of varying diameters. Furthermore, no parts impeding the bobbin tube shifting movement are present.

10 Claims, 3 Drawing Figures

APPARATUS FOR SORTING CONICAL BOBBIN TUBES

BACKGROUND OF THE INVENTION

The present invention relates to a new and improved apparatus for sorting substantially conical bobbin tubes and to a method of using such apparatus for supplying a plurality of substantially conical bobbin tubes to a bobbin tube transport belt of a ring spinning or ring twisting machine.

In its more particular aspects, the present invention relates specifically to a new and improved apparatus for sorting substantially conical bobbin tubes, which comprises a transporting device with at least one trough-shaped transporting pocket, which together with an individual bobbin tube each placed therein is movable transversely to its longitudinal dimension, and which apparatus furthermore comprises means for shifting the bobbin tube placed in the transporting pocket in the one or in the opposite direction of its longitudinal dimension, depending on the relative position of the bobbin tube base end and the bobbin tube tip end.

On textile machines bobbin tubes are used in many manners for winding yarns or threads, or similar items, thereon. It generally proves advantageous to apply bobbin tubes of conical shape. Such bobbin tubes are to be presented in the correct position if they are to be mechanically placed into the machine. In particular, the position of the bobbin tube tips must be always the same with respect to the bobbin tube foot, i.e. the bobbin tubes are to be presented at the insertion point in the same orientation or oriented with the foot ends to the same side.

The apparatus according to the invention is used for this purpose, i.e. is used for sorting bobbin tubes, the foot ends of which are not yet oriented to the same side.

In the operation of e.g. ring spinning or ring twisting machines such bobbin tubes consecutively are placed onto the transporting belt of an automatic doffing device and later on are carried away again as wound bobbin tubes. Placement of the bobbin tubes is effected automatically, the bobbin tubes being taken from a storage receptacle. In the receptacle the bobbin tubes are arranged parallel, but not oriented with the same ends to the same side. As the conical bobbin tubes are placed onto the transporting belt, the bobbin tube ends with the large diameter (bobbin tube foot ends) are to be placed onto the pegs of the transporting belt. An important use of the inventive apparatus is the sorting of the bobbin tubes for the purpose of arranging the bobbin tubes in positions with the same end type oriented to the same side and of placing them onto the transporting belt.

From the Swiss Patents No. 457.233 and No. 507.863, and from the German Patent DOS No. 2.003.594 devices to be used for this purpose have become known. They show, however, the disadvantage that they are unsuitable for bobbin tubes of different diameter. The guide edges, or the kick-out levers respectively, according to these publications, which effect a lateral shifting movement of the bobbin tubes, according to these patents are fixed with respect to their height position, and thus cannot not be adapted to different bobbin tube diameters.

An improvement of these conditions is effected using a device acording to Swiss Patent Application No. 6170/78. In this arrangement the height position of the guide edges is determined by a rod, which contacts the center zone of the bobbin tube, its height position thus being determined by the mean bobbin tube diameter. Experience has shown, however, that the bobbin tubes are slowed in their shifting movement by the rod contacting them, which is undesirable, as the reliability of the function is impaired in this manner. If guide edges are used, it furthermore can occur that a bobbin tube foot end, which is damaged, can penetrate under the guide edge or can be jammed.

SUMMARY OF THE INVENTION

Therefore, with the foregoing in mind it is a primary object of the present invention to provide a new and improved apparatus for sorting substantially conical bobbin tubes which is not afflicted with the aforementioned drawbacks and limitations of the prior art constructions heretofore discussed.

Now in order to implement these and still further objects of the invention, which will become more readily apparent as the description proceeds, the apparatus of the present development is manifested by the features that, the means for shifting the bobbin tubes comprise two rolls, which can be placed onto the transporting device, and which are supported in rotational bearings, that the rotational bearings are arranged on a frame, which is pivotable about a pivoting axis, at equal distances from the pivoting axis, that the pivoting axis extends parallel to the trough forming the transporting pocket, and that the rotational axes of the rolls on the same side of a straight line connecting the rotational bearings penetrate an imagined plane arranged at right angles to, and dividing in equal halves, the transporting pocket.

The one roll, and only this roll, which during the movement of the bobbin tube is located above the bobbin tube zone of larger diameter, contacts the bobbin tube, and only this one roll can effect a lateral shifting movement of the bobbin tube. The rolls not necessarily have to engage the bobbin tube ends, but they can act upon any desired zone along the longitudinal direction of the bobbin tube. As damages to the bobbin tubes in most cases occur at their ends, the susceptibility to disturbances thus is reduced. In principle, the rolls can be arranged in very close vicinity. A certain distance between the rolls, however, is preferable for increased reliability of the functionality. It is of importance, however, that the bobbin tubes during their lateral shifting movement activated by the rolls are not subject to any braking action, and that the rolls used for laterally shifting the bobbin tubes are simple elements and thus practically are not subject to disturbances.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figures 1, 2:
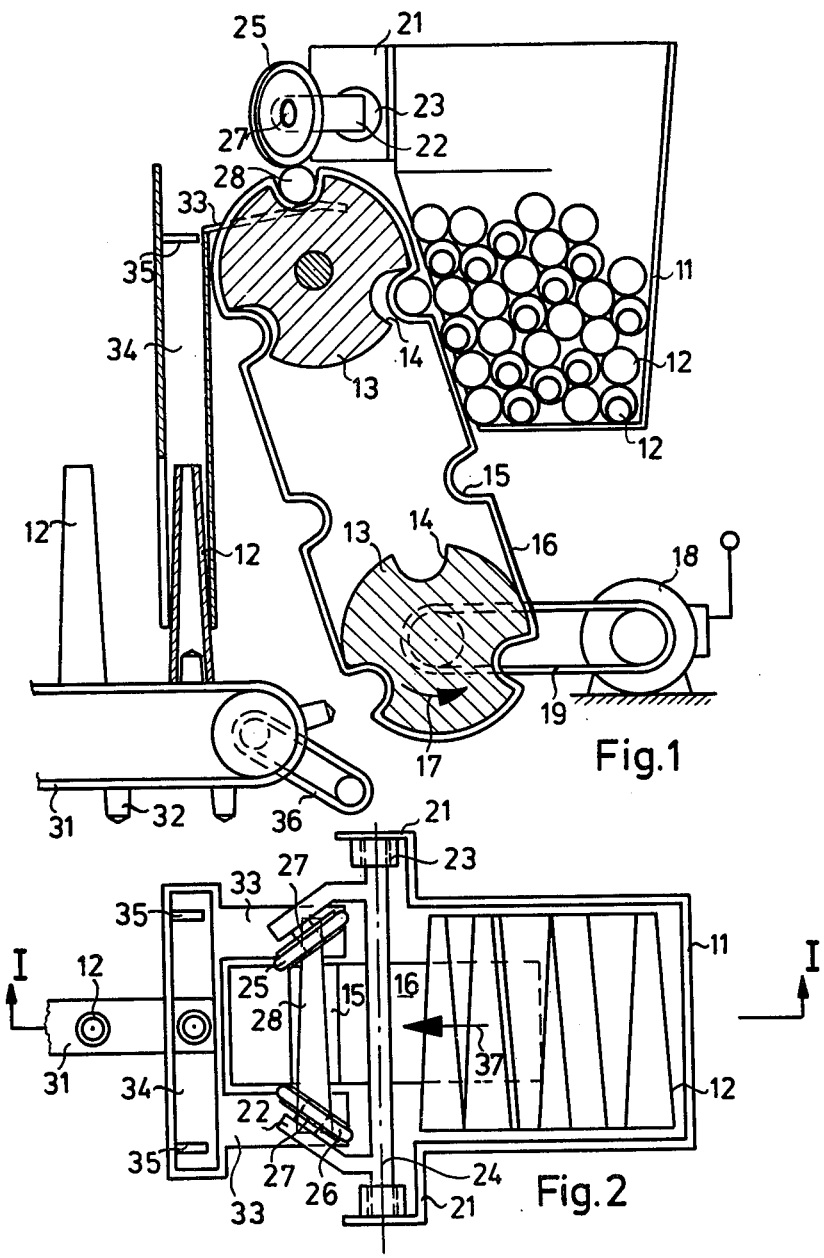
FIG. 1 is a cross-section along line I—I in FIG. 2 of a first embodiment of the apparatus according to the invention.
FIG. 2 is a top plan view of the apparatus as shown in FIG. 1.

Describing now the drawings, it is to be understood that only enough of the construction of the apparatus has been shown as needed for those skilled in the art to readily understand the underlying principles and concepts of the present development, while simplifying the showing of the drawings. Turning attention now specifically to the first embodiment of the apparatus according to the invention shown in FIGS. 1 and 2, a receptacle 11 is illustrated, in which bobbin tubes 12 of conical form are stored. These bobbin tubes 12 are arranged substantially parallel mutually, but not with the same ends to the same side.

A transporting device comprises two rolls or drums 13 provided with troughs 14, and a transporting belt 16 provided with trough-shaped pockets 15 runs over the rolls 13. As the transporting belt 16 moves, the pockets 15 always coincide with the troughs 14. The arrow 17 indicates the direction of the movements. The drive is effected by a motor 18 via a drive belt 19.

On support members 21 a frame 22, which is rigid in itself, is pivotably supported in bearings 23. The frame 22 pivots about a pivoting axis 24. The frame 22 supports two rolls 25,26, which are arranged at an angle as shown in the figure. The rolls 25,26 are freely rotatable in the rotational bearings 27. The bobbin tube located in the uppermost pocket 15 is designated 28.

In FIGS. 1 and 2 the apparatus according to application of the present invention is shown in use with a ring spinning or ring twisting machine. A bobbin tube transporting belt of the machine is designated 31. At predetermined spaces pegs 32 are mounted thereon, onto which pegs 32 bobbin tubes 12 are placed. The bobbin tubes 12 to be placed are transferred to a table 33, from where they are moved into a drop chute 34, in which two directing pins 35 are arranged. The transporting belt 31 is driven by a drive mechanism 36.

In operation each pocket 15 takes over, as it moves across the receptacle 11, which is open towards the transporting belt 16, one bobbin tube 12 and moves it upward. As one of these bobbin tubes, as shown with the bobbin tube 28, passes under the rolls 25,26, one of these rolls, namely the one located over a zone of a larger bobbin tube diameter (i.e. the roll 26 in FIGS. 1 and 2) as compared to the other roll, contacts the bobbin tube 28. Of the rolls 25,26, which are arranged at an angle with respect to the direction of movement (arrow 37) of the transporting pocket 15 supporting the bobbin tube 28, the roll 26, which contacts the bobbin tube 28, effects a shifting movement of the bobbin tube 28 in the direction pointed from the bobbin tube base end to the bobbin tube tip end. In this manner the sorting operation for these bobbin tubes 28 is effected.

As the bobbin tube 28 moves on in its laterally shifted position, it reaches the table 33, from where it is guided into the drop chute 34. As it enters the upper opening of the drop chute 34, it collides, as it has been brought into a laterally shifted position, with its bobbin tube tip with the pin 35, arranged at the right hand side relative to the direction of the arrow 37. In this manner the bobbin tube 28 drops with its bobbin tube base end in front into the drop chute 34 and onto the corresponding peg 32 of the transporting belt 31.

If now a bobbin tube 12, the bobbin tube base end of which is located at the right hand side with respect to the arrow 37, is transported to a position under the rolls 25,26, the roll 25 contacts the bobbin tube. Consequently this bobbin tube is shifted to the left hand side, as seen in relation to the arrow 37 by the sorting process. The bobbin tube tip end (which in this case is located on the left hand side relative to the arrow 37) collides with the guiding pin 35 arranged on the left hand side, and the bobbin tube 12 thus moves through the drop chute 34 again with its base end in front.

Figure 3:
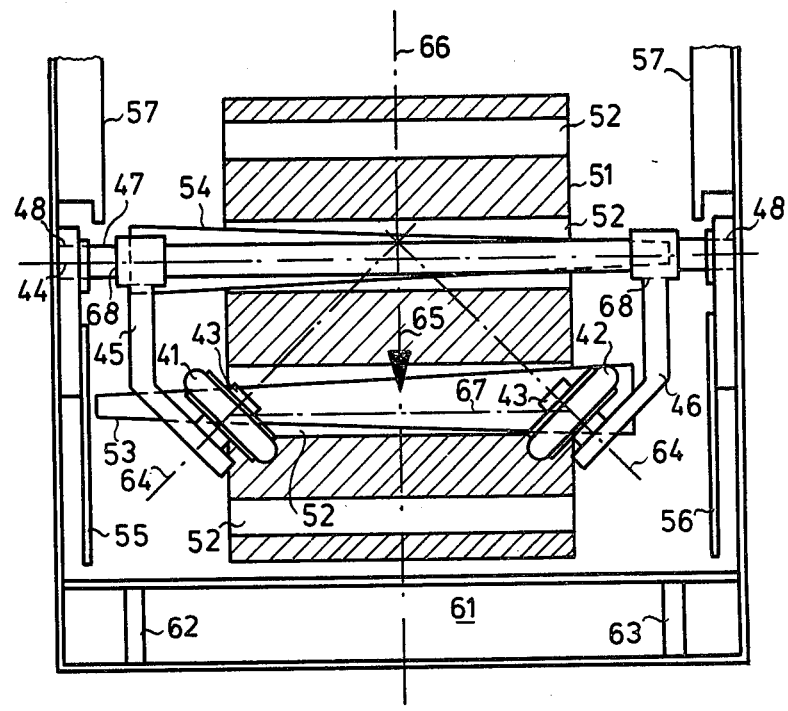
FIG. 3 is a top plan view of a second embodiment of the apparatus according to the invention.

A second embodiment of the inventive sorting apparatus is shown, in more detail than possible in FIGS. 1 and 2, in FIG. 3. According to FIG. 3 again two rolls 41,42 are provided, which are supported freely rotatable in rotational bearings. The latter are supported by arms 45,46, which with the shaft 47 form a rigid unit, or a rigid frame respectively. The shaft 47 is pivotable about its pivoting axis 44 and is supported in bearings 48.

The transporting device for transporting the bobbin tubes 53,54 is formed by a circular-cylindrical drum or roll 51, which is rotatable about an axis (not shown) parallel to the shaft 47. At the drum 51 pockets 52 are arranged at regular intervals, which are used for taking up a bobbin tube each. In FIG. 3 two bobbin tubes 53,54 placed in pockets 52 are shown. The rolls 41 and 42 come into contact in the zones of the drum shown hatched, and as the frame 45,46,47 pivots about the pivoting axis 44, always maintain the same distance from these bobbin tube sleeve zones. The guide plates 55,56 form a lateral limitation for the bobbin tubes 53,54. The guide plates 57 are used for guiding the bobbin tubes to the drum or roll 51. Furthermore, a drop chute 61 with the two guide pins 62 and 63 is provided. A bobbin tube receptacle for the bobbin tubes to be supplied is not shown for better clarity of the figure.

In operation of the apparatus according to FIG. 3 the drum or roll 51 rotates in the sense of rotation indicated by the arrow 65, and in this process consecutively a bobbin tube each is placed into each pocket 52. As long as the rolls 41,42 are located above a sleeve zone, shown hatched, of the drum or roll 51, both rolls 41,42 are contacting this sleeve zone. As the bobbin tube 53 passes under the rolls 41,42, the zone of its bobbin tube base is brought into contact with the roll 42. In this process the latter is set into rotation and is lifted somewhat. As the arms 45, 46 and the shaft 47 form a rigid element, or a rigid frame respectively, the roll 41 also is lifted in such a manner that it does not contact the bobbin tube 53. Owing to the rotation of the roll 42, which is arranged at an angle (with respect to the drum movement), the bobbin tube 53 is shifted laterally in the direction towards its tip end. In this process it is moved towards the guide plate 55, in which manner the sorting process for the bobbin tube 53 is effected.

After complete passage under the rolls 41,42 the bobbin tube then reaches the entry opening of the drop chute 61, through which it drops, after colliding with its bobbin tube tip end against the guide pin 62, with its bobbin tube base oriented towards the front.

In the passage of the subsequent bobbin tube 54 under the rolls the action of the latter is inversed. The zone of relatively large diameter in the region of the bobbin tube base end of the bobbin tube 54 is brought into contact with the roll 41, the latter being rotated in the process. In this manner the bobbin tube 54 is shifted towards the guide plate 56. The guide plate 56 is used, if required, for limiting this lateral movement.

As the bobbin tube 54 enters the entry opening of the drop chute 61, the bobbin tube tip end collides with the guide pin 63 in such a manner that the bobbin tube 54 drops into the drop chute also with its base end in front, both bobbin tubes 53,54 thus arriving with the same end oriented to the same side.

If a sorting process for the bobbin tubes, again in combination with a drop chute 61, is desired, in which the bobbin tubes 53,54 are transferred into the drop chute 61 with their bobbin tube tip ends leading, this can be achieved by interchanging the angles of inclination, in which the rolls 41,42 are arranged, which rolls in this case are to be arranged in such a manner that they are not arranged coverging, as seen in the direction of the arrow 65, but arranged diverging.

If a plane 66 is imagined, which is arranged at right angles with respect to, and dividing equally, the pockets 52, as indicated with the dash-dotted line, furthermore the rotational axes 64 of the rolls 41,42 and the straight line 67, connecting the rotational bearings 43, are considered, the following situation is noted:

If the bobbin tubes are to be transferred into the drop chute 61 with their bobbin tube base ends in front, i.e. leading, the rotational axes 64 of the rolls 41,42 penetrate the plane 66, in relation to the direction of movement of the transporting pockets 52 indicated by the arrow 65, in front of the straight line 67 connecting the rotational bearings 43. In this arrangement the two rotational axes 64 not necessarily have to penetrate the plane 66 in the same point.

Inversely, if the bobbin tubes are to be transferred into the drop chute with their bobbin tube tip ends in front, i.e. leading, the rotational axes 64 penetrate the plane 66, as seen in relation to the direction indicated by the arrow 65, behind the straight connecting line 67.

In an advantageous embodiment of the invention the diameters of the rolls 41,42 are chosen equal and with respect to the direction of the arrow 65 are arranged inclined under the same angle. In this case the rotational axes 64 penetrate the plane 66 in the same point, and together with the straight connecting line 67 they form an equal-legged triangle, the equal legs of which are formed by the rotational axes 64.

The angles formed by the straight connection line 67 with the rotational axes 64 preferentially range between 20 and 50 degrees.

It is desirable that the rolls 25 and 41,42 at least in the zone of contact with the bobbin tubes 12,28,53, 54 are provided with a high friction surface coat, and that the surfaces of the transporting pockets 15,52 are low friction surfaces.

A further design example of the invention consists in the provision of a rotatable link (not shown), of a type known as such, e.g. at the bending points of the arms 45 and 46, which permits setting the angle of the rolls 41,42 as desired, by horizontally pivoting the arm sections on which the rolls are mounted, with respect to the direction of the arrow 65, and upon setting them to fix the arm sections again rigidly.

Furthermore, in a further alternative design example, the support elements 68 can be designed shiftable along the shaft 47 and can be fixed using a clamping screw (not shown) in such a manner that upon shifting the arms 45,46 to a desired position they can be fixed again with respect to the shaft. In this manner the rolls 41,42 can be adapted in many ways to the bobbin tubes.

While there are shown and described present preferred embodiments of the invention, it is to be distinctly understood that the invention is not limited thereto, but may be otherwise variously embodied and practiced within the scope of the following claims. Accordingly,

I claim:

1. An apparatus for sorting substantially conical bobbin tubes, comprising:

transporting means including at least one substantially trough-shaped transporting pocket for receiving an individual substantially conical bobbin tube;

said at least one transporting pocket having a longitudinal dimension;

said at least one transporting pocket together with said substantially conical bobbin tube located therein being transportable by said transporting means in a predetermined transport direction which extends transversely relative to said longitudinal dimension of said at least one transporting pocket;

said at least one transporting pocket receiving therein said substantially conical bobbin tube which defines a longitudinal axis, a base end and a tip end, in either one of two opposite positions with respect to the location of the base end and the tip end of said substantially conical bobbin tube;

means for longitudinally displacing said substantially conical bobbin tube in said at least one transporting pocket in either one of two opposite directions depending upon the relative position of said base end and of said tip end of said substantially conical bobbin tube located in said at least one transporting pocket;

said longitudinal displacing means comprising:

two rolls each journaled in a related roller bearing for rotation about a related rotational axis;

a frame;

said frame being supported for pivotable movement about a pivot axis extending substantially parallel to said at least one transporting pocket;

said roller bearings being mounted at said frame and being substantially equally spaced from said pivot axis of said frame;

said two rolls being arranged such that said rotational axes thereof extend through an imaginary plane, which extends substantially at right angles to said at least one transporting pocket and divides the same into equal halves, on the same side of an imaginary straight line which interconnects said roller bearings;

said two rolls being arranged such that their rotational axes intersect said imaginary plane at a predetermined angle and extend at a further angle relative to said longitudinal axis of said substantially conical bobbin tube; and said two rolls being displaceable towards said transporting means such that one of said two rolls bears upon said substantially conical bobbin tube placed in said at least one transporting pocket, while the other one of said two rolls stays out of contact therewith, in order to exert a transversely directed force on said substantially conical bobbin tube so as to laterally displace the same relative to said transport direction.

2. The apparatus as defined in claim 1, wherein:

said two rolls are of essentially the same diameter; and said rotational axes of said two rolls constitute the two equal legs of an isosceles triangle which includes said imaginary straight line interconnecting said roller bearings.

3. The apparatus as defined in claim 1, wherein: said rotational axes of said two rolls intersect said imaginary plane extending substantially at right angles to and through said at least one transporting pocket forwardly of said imaginary straight line interconnecting said roller bearings as seen in said predetermined transport direction.

4. The apparatus as defined in claim 1, wherein: each one of said two rolls defines a related contact zone bearing upon said substantially conical bobbin tube placed in said at least one transporting pocket; and
said contact zone of each one of said two rolls being provided with a high friction coating.

5. The apparatus as defined in claim 1, wherein: said at least one transporting pocket comprises a surface of low-sliding friction.

6. The apparatus as defined in claim 3, wherein: said rolls are arranged such that their rotational axes form a further predetermined angle with said imaginary straight line interconnecting said roller bearings; and
said further predetermined angle being in the range of 20 to 50 degrees.

7. The apparatus as defined in claim 1, wherein: said transporting means comprise:
two rotatable rollers each of which defines a surface;
a transport belt extending around said two rotatable rollers and comprising a predetermined number of transporting pockets constituting said at least one transporting pocket;
each said transporting pocket extending transversely of said transport belt;
a predetermined number of troughs provided in said surface of each one of said two rollers; and
said transporting pockets of said transport belt coinciding with said troughs in said surfaces of said two rollers.

8. The apparatus as defined in claim 1, wherein: said frame comprises support members;
said support members and said roller bearings forming an assemly mounted at said frame;
said assembly being displaceable in a direction substantially parallel to said pivot axis of said frame into a selected position.

9. The apparatus as defined in claim 8, wherein: said assembly is arranged for pivotable movements about a substantially horizontal axis into a selected pivot position; and
said assembly being rigidly fixable in said selected pivot position.

10. The apparatus as defined in claim 1, wherein: said frame comprises support members;
said suport members and said roller bearings forming an assembly mounted at said frame;
said assembly being displaceable in a direction substantially parallel to said pivot axis of said frame into a selected position; and
said assembly being pivotable about a substantially horizontal axis into a selected pivot position.

* * * * *

UNITED STATES PATENT AND TRADEMARK OFFICE
CERTIFICATE OF CORRECTION

PATENT NO. : 4,480,740

DATED : November 6, 1984

INVENTOR(S) : WüRMLI

It is certified that error appears in the above-identified patent and that said Letters Patent is hereby corrected as shown below:

Column 1, line 54, please delete "457.233" and insert --457.223--

Column 1, line 66, after "device" please delete "acording" and insert --according--

Signed and Sealed this

Second Day of April 1985

[SEAL]

Attest:

DONALD J. QUIGG

Attesting Officer

Acting Commissioner of Patents and Trademarks